(12) United States Patent
Runft et al.

(10) Patent No.: US 9,255,824 B2
(45) Date of Patent: Feb. 9, 2016

(54) APPARATUS FOR METERING PULVERULENT FILLING MATERIAL

(75) Inventors: Werner Runft, Winnenden (DE); Jens Schlipf, Freiberg A. N. (DE); Walter Boehringer, Remshalden (DE)

(73) Assignee: Robert Bosch GmbH, Stuttgart (DE)

( * ) Notice: Subject to any disclaimer, the term of this patent is extended or adjusted under 35 U.S.C. 154(b) by 143 days.

(21) Appl. No.: 14/000,808

(22) PCT Filed: Jan. 31, 2012

(86) PCT No.: PCT/EP2012/051586
§ 371 (c)(1),
(2), (4) Date: Aug. 21, 2013

(87) PCT Pub. No.: WO2012/113615
PCT Pub. Date: Aug. 30, 2012

(65) Prior Publication Data
US 2013/0327791 A1    Dec. 12, 2013

(30) Foreign Application Priority Data

Feb. 21, 2011 (DE) .......................... 10 2011 004 456
Oct. 27, 2011 (DE) .......................... 10 2011 085 283

(51) Int. Cl.
G01F 11/00    (2006.01)
G01F 1/00    (2006.01)
G01F 11/24    (2006.01)
B65B 1/36    (2006.01)

(52) U.S. Cl.
CPC ... *G01F 1/00* (2013.01); *B65B 1/36* (2013.01); *G01F 11/006* (2013.01); *G01F 11/24* (2013.01)

(58) Field of Classification Search
CPC ....... G01F 11/006; G01F 11/24; B65B 1/366; B65B 1/16
USPC ......... 222/267, 282–284, 286, 216–218, 368, 222/636
See application file for complete search history.

(56) References Cited

U.S. PATENT DOCUMENTS 709,793 A * 9/1902 McGinnity .................... 222/218
733,682 A * 7/1903 Smith ...................... B67D 1/16
141/178
1,563,756 A * 12/1925 Liberman ....................... 222/80
(Continued)

FOREIGN PATENT DOCUMENTS

CH        524362        6/1972
DE       1210997        2/1966
(Continued)

OTHER PUBLICATIONS

International Search Report for Application No. PCT/US2012/051586 dated Apr. 25, 2012 (2 pages).

*Primary Examiner* — Patrick M Buechner
*Assistant Examiner* — Randall Gruby
(74) *Attorney, Agent, or Firm* — Michael Best & Friedrich LLP

(57) ABSTRACT

The invention provides an apparatus for metering pulverulent filling material, comprising at least one metering wheel with a plurality of metering chambers for accommodating filling material, wherein a plurality of metering chambers are formed by means of a common component, and the common component can be displaced in the radial direction of the metering wheel using an adjusting means in order to change the volume of the metering chambers.

11 Claims, 2 Drawing Sheets

(56) References Cited

U.S. PATENT DOCUMENTS

| | | | | |
|---|---|---|---|---|
| 2,540,059 | A | * | 1/1951 | Stirn et al. ............... 141/1 |
| 2,684,186 | A | * | 7/1954 | Mattos .................... 222/218 |
| 2,751,115 | A | * | 6/1956 | Kindseth ................. 222/77 |
| 2,888,963 | A | * | 6/1959 | Guyer ...................... 141/144 |
| 2,913,018 | A | * | 11/1959 | Lewis, Jr. et al. ........ 141/91 |
| 3,168,121 | A | * | 2/1965 | Barthelemy ............. 141/141 |
| 3,339,595 | A | * | 9/1967 | Pechmann ............... 141/44 |
| 3,353,722 | A | * | 11/1967 | Mehta ...................... 222/218 |
| 3,446,404 | A | * | 5/1969 | Mehta ...................... 222/225 |
| 3,558,016 | A | * | 1/1971 | Beinhofer ................ 222/218 |
| 3,578,217 | A | * | 5/1971 | Miller ...................... 222/218 |
| 3,656,518 | A | * | 4/1972 | Aronson .................. 141/1 |
| 4,005,668 | A | * | 2/1977 | Washington et al. ..... 141/67 |
| 4,284,030 | A | * | 8/1981 | Hamilton ................. 118/406 |
| 4,437,294 | A | * | 3/1984 | Romagnoli ............... 53/553 |
| 4,509,568 | A | * | 4/1985 | Kawaguchi et al. ..... 141/129 |
| 4,640,448 | A | * | 2/1987 | Trechsel .................. 222/636 |
| 4,662,915 | A | * | 5/1987 | Shirai et al. ............. 55/511 |
| 4,671,430 | A | * | 6/1987 | Dinius ..................... 222/135 |
| 4,684,040 | A | * | 8/1987 | Jonovic et al. ........... 222/148 |
| 4,709,837 | A | * | 12/1987 | Erdman ................... 222/636 |
| 4,870,808 | A | * | 10/1989 | Romagnoli ............... 53/529 |
| 5,081,819 | A | * | 1/1992 | Cloud ...................... 53/453 |
| 5,377,727 | A | * | 1/1995 | Ueda .................... B65B 1/366 141/178 |
| 5,405,059 | A | * | 4/1995 | Wadell .................... 222/306 |
| 6,182,712 | B1 | * | 2/2001 | Stout et al. .............. 141/18 |
| 6,283,176 | B1 | | 9/2001 | Wurst et al. |
| 6,799,409 | B2 | * | 10/2004 | Altvater et al. ......... 53/122 |
| 7,624,771 | B2 | * | 12/2009 | Parks et al. ............. 141/67 |
| 7,661,248 | B2 | * | 2/2010 | Conti ...................... 53/529 |
| 7,849,889 | B2 | * | 12/2010 | Smith et al. ............. 141/125 |
| 8,485,347 | B2 | * | 7/2013 | Jackels ................... 198/689.1 |
| 8,602,068 | B2 | * | 12/2013 | Williams ................. 141/65 |
| 2005/0023297 | A1 | * | 2/2005 | Zill et al. ................ 222/250 |
| 2005/0173552 | A1 | | 8/2005 | Friberg et al. |
| 2013/0255833 | A1 | * | 10/2013 | Runft et al. ............. 141/145 |
| 2014/0037061 | A1 | * | 2/2014 | Runft et al. ............. 378/62 |

FOREIGN PATENT DOCUMENTS

| | | | |
|---|---|---|---|
| DE | 102007018036 | | 10/2008 |
| GB | 1118520 | * | 7/1968 |
| JP | S58167917 | | 10/1983 |

* cited by examiner

APPARATUS FOR METERING PULVERULENT FILLING MATERIAL

BACKGROUND OF THE INVENTION

The present invention relates to an apparatus for metering pulverulent filling material. An apparatus of the relevant type is already known from DE 10 2007 018 036 A1. This comprises a filling wheel with at least one metering chamber for accommodating filling material, wherein the metering chamber is arranged in a sleeve element. An adjusting device is provided for adjusting a position of the sleeve element in the radial direction of the filling wheel. The sleeve element is arranged in an opening in a housing.

It is the underlying object of the invention to indicate an apparatus for metering pulverulent filling material which allows simple adjustment of the metering volume with a multiplicity of metering chambers in a particularly simple manner.

SUMMARY OF THE INVENTION

Given the above, the apparatus according to the invention for metering pulverulent filling material has the advantage that it can be adjusted in a particularly simple manner by virtue of the integration of a plurality of metering chambers in a common component, preferably a format-specific bar. It is thereby possible to reduce the number of individual parts in the metering apparatus. In particular, it is possible to have recourse to just a small number of format-specific components that are expensive to produce, thanks to what is now a simple way of adjusting the metering volume of a plurality of integrated metering chambers. Moreover, the apparatus can be assembled and moved jointly in a compact manner as a unit.

In an expedient development, provision is made for the common component to have at least one recess to accommodate a supporting means. It is now a particularly simple matter to introduce a filter between the underside of the metering chambers and the supporting means. This filter can preferably extend across a plurality of metering openings, thus enabling just a single filter to be used for a plurality of metering chambers. Exchanging the filter is thereby also made easier.

In an expedient development, provision is made for the supporting means to have a common air duct, which is connected to a plurality of metering chambers. It is thereby possible to further simplify the component and to ensure more reliable filling and emptying of the metering chambers through the appropriate application of a vacuum or compressed air.

In an expedient development, provision is made for a plurality of common components to be provided, each having a multiplicity of metering chambers with the corresponding sleeve projections. These common components can be adjusted equally by means of a single adjusting means to change the metering volume. A cam is preferably used as an adjusting means.

In an expedient development, provision is made for spring means to exert on the common component a force opposite to the direction of movement of the adjusting means. This ensures that the common component can also be adjusted back in the direction opposite to the direction of movement.

In an expedient development, provision is made for the air duct to be connected to a coupling part. This ensures that the common component with the air duct contained therein can also be adjusted, at least in the radial direction.

Further expedient developments will become apparent from further dependent claims and from the description.

BRIEF DESCRIPTION OF THE DRAWINGS

An illustrative embodiment of the apparatus according to the invention for metering pulverulent filling material is illustrated in the drawing and described in greater detail below.

DETAILED DESCRIPTION

Figure 1:
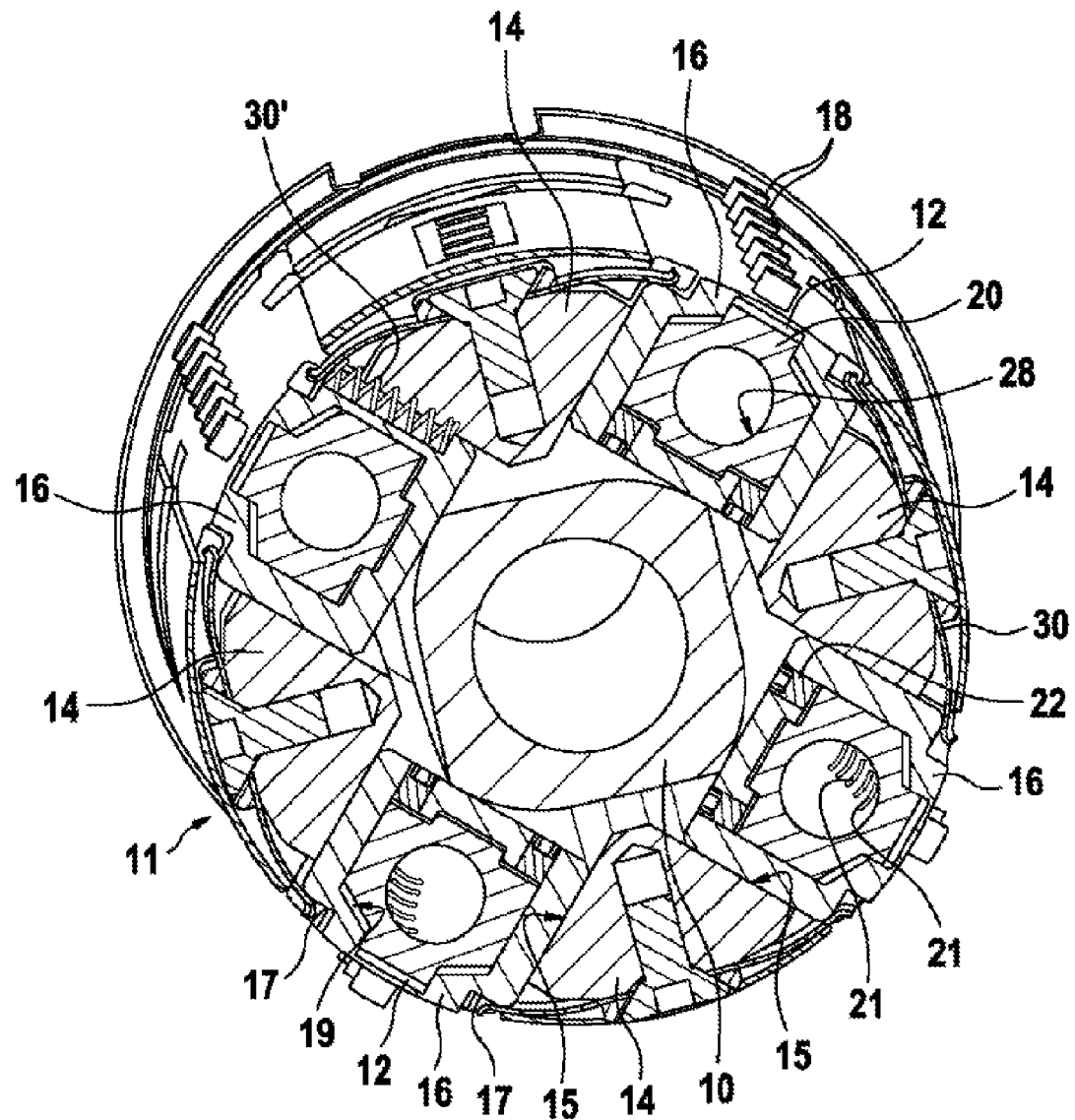
FIG. 1 shows a perspective view as a cross section through the metering wheel.

An apparatus 8 for metering comprises a metering wheel 11. This metering wheel 11 consists of guide means 14, which form a fixed part of the metering wheel 11 and have guide surfaces 15, over which the common components 16 can be moved in the radial direction. For this purpose, adjusting means 10 are provided, said adjusting means having a cam-shaped contour. By rotating the adjusting means 10, the four common components 16 can be adjusted in the same way in the radial direction. By way of example, the metering wheel 11 has four common components 16, which are each arranged offset by 90° on the circumference of the metering wheel 11. The common component 16 is of substantially rectangular design. In the interior, it has a cavity 19. The cavity 19 serves to accommodate a supporting means 20. On the outward-oriented upper side, the common component 16 has a plurality of sleeve projections 18 arranged adjacent to one another in the axial direction. As an extension of the openings in the sleeve projections 18, the supporting means 20 has corresponding openings 21. The supporting means 20 has a substantially rectangular cross section, with the outward-directed upper side being reduced in length relative to the base by means of chamfers. The side faces are of parallel design and are oriented substantially in the radial direction, said side faces thus enabling the supporting means 20 to be moved relative to the common component 16. The interior of the supporting means 20 is likewise hollow, giving rise to an air duct 28. This air duct 28 connects all the openings 21 of the supporting means 20. The upper side of the supporting means 20 serves as a countersurface for a filter 12, which is arranged between the sleeve projections 18 and the openings 21. The supporting means 20 can be moved easily in the radial direction within the cavity 19, thus enabling the filter 12 to be clamped and also enabling the clamping to be canceled in order to replace the filter 12. To clamp the filter 12, appropriate clamping means 22, such as screws, particularly preferably grub screws, are provided, said screws pressing the supporting means 20 radially outward against the filter 12 and the common component 16. Secured on the outside of the guide means 14 are spring means 30, which, at the outer circumference, engage in a shoulder 17 of the common component 16. This shoulder 17 is, for example, formed by a corresponding recess on the radially outer side of the common component 16. The spring means 30 exerts a force directed toward the center of the metering wheel 11 on the common component 16, with the result that, when the lift of the adjusting means 10 is reduced, the common component 16 is moved in the direction of the center of the metering wheel 11. As an alternative, it would also be possible to provide a spring means 30' which was arranged in the radial direction and was supported relative to the guide means 14 on a shoulder of the common component 16 which is arranged closer to the center in order to apply the appropriate force in the direction of the center.

Figure 2:
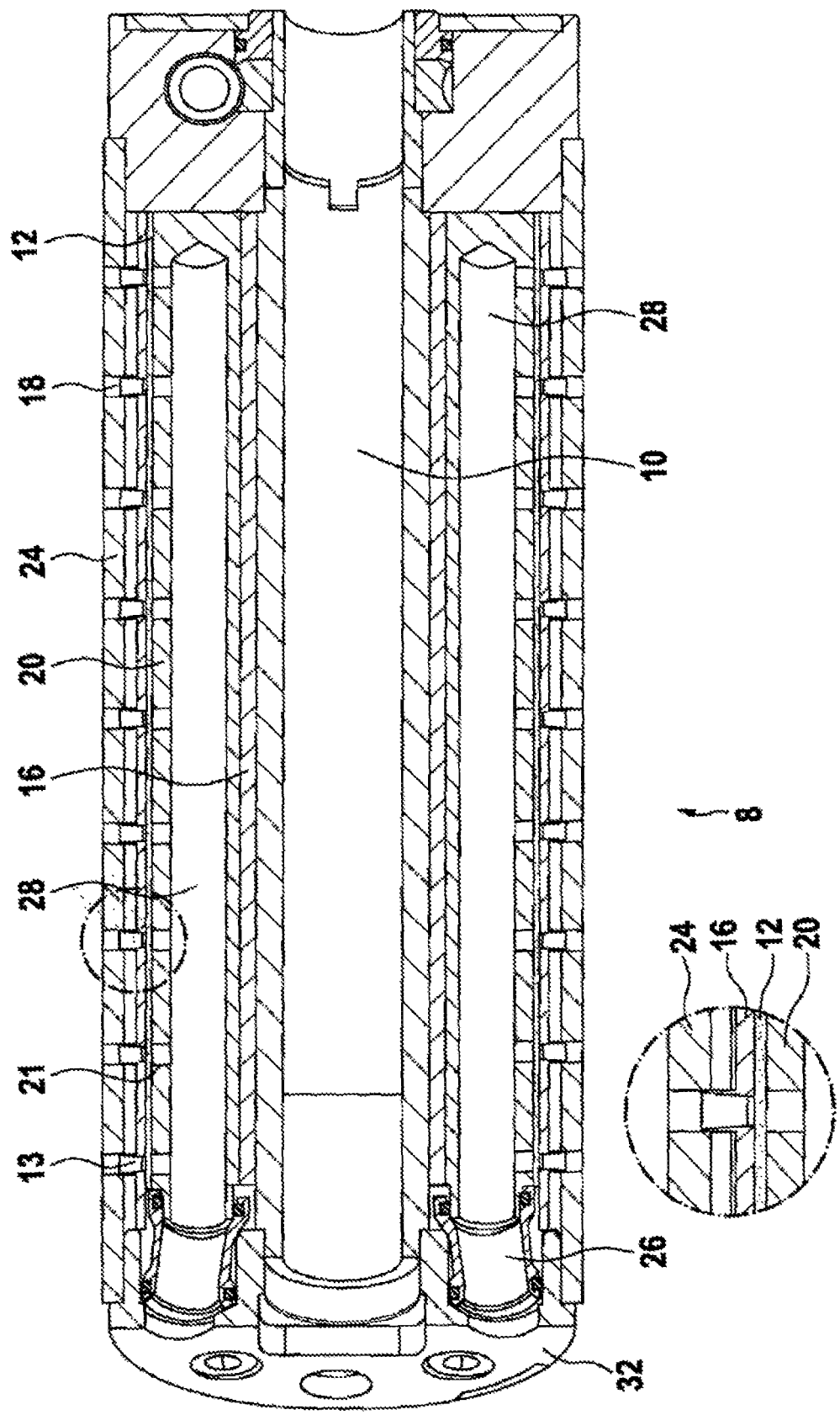
FIG. 2 shows a longitudinal section through the metering wheel in perspective view.

According to FIG. 2, the metering wheel 11 is then shown with a metering drum sleeve 24 which forms the outer surface or circumferential surface of the metering wheel 11. As a radial extension of the sleeve projections 18, respective corresponding openings are provided in the metering drum sleeve 24. The inside diameter of said openings in the metering drum sleeve 24 is matched to the outside diameter of the sleeve projections 18, thus enabling the sleeve projections 18 to be moved into the openings in the metering drum sleeve 24 when the common component 16 is moved radially outward. A metering chamber 13 for filling with filling material is now formed by the volume bounded by the openings in the metering drum sleeve 24, the internal openings in the sleeve projections 18, as far as the filter 12. The metering volume of the metering chambers 13 can be changed by means of a radial adjustment of the sleeve projections 18. The metering drum sleeve 24 is held by the outer surfaces of the guide means 14 and by laterally arranged bearing covers 32. The common components 16 are designed to be adjustable relative to the metering drum sleeve 24. In the bearing cover 32, there is also an opening for the air connection of the air duct 28. This opening in the bearing cover 32 is connected via a coupling part 26 to the air duct 28, making it possible to achieve mobility of the common component 16 relative to the bearing cover 32 and to the metering drum sleeve 24.

The apparatus 8 described for metering pulverulent filling material operates as follows. The metering wheel 11 is suitable precisely for metering small quantities of powder in the pharmaceutical sector. The quantity of pulverulent filling material to be metered is determined by the volume of the metering chamber 13. This volume of the metering chamber 13 can be adjusted by means of the movement of the common component 16 relative to the metering drum sleeve 24. The filling material, e.g. powder or pellets, to be dispensed is situated in a filling funnel (not shown). The container situated underneath said funnel is bounded at the bottom opening thereof by the metering drum sleeve 24 of the metering wheel 11 and, in the running direction, by a powder doctor (likewise not shown). The metering wheel 11 can be cantilever-mounted or, alternatively, can be supported by a counter bearing. The metering wheel 11 is driven by a drive shaft. In a filling position, the metering wheel 11 is arranged underneath a filling material container in such a way that the metering chambers 13 can be filled with filling material. To assist the filling process, a vacuum across the filter 12 is built up via the air duct 28, sucking the filling material into the metering chambers 13 as far as the filter 12. Here, the filter 12 prevents the filling material from entering the air duct 28. It should be noted that other filling methods, e.g. those based on mechanical means or exclusively on gravity, can also be used to fill the metering chambers 13.

Once the metering chambers 13 are filled, the metering wheel 11 is turned through 180°, with the result that the metering chambers 13 are arranged in a dispensing position. In the dispensing position, the air duct 28 is connected to a pressure connection, with the result that compressed air flows through the filter 12 and forces out the filling material in the metering chambers 13. In this case, containers to be filled (not shown) are arranged underneath the metering wheel 11, and the filling material is then dispensed into said containers. The containers can be, for example, open capsules, which are arranged on a conveyor belt or on a segment for the bottom half of a capsule and are conveyed onward after filling. Since a plurality of common components 16 is provided in the metering wheel 11, preferably four in the illustrative example, the metering wheel 11 is always turned stepwise as far as the next common component 16, thereby enabling the particular metering chambers 13 that are at the top to be filled, while the filled metering chambers 13 at the bottom are emptied again.

The common component 16 is embodied as a format-specific component. In particular, it comprises a plurality of sleeve projections 18 arranged in series in the axial direction, each of which is open toward the cavity 19. The side faces of the common component 16 are oriented in such a way relative to the guide surfaces 15 of the guide means 14 that they make possible radial adjustment of the common component 16 with the integrated sleeve projections 18. The bottom surface of the common component 16, said surface being oriented in the direction of the center of the metering wheel 11, interacts with a cam of the adjusting means 10 for radial adjustment. The adjusting means 10 is rotatably mounted and can be turned by means of a corresponding adjusting hub with an associated adjusting wheel. If the metering volume of the metering chamber 13 is to be reduced, the cam of the adjusting means 10 pushes the common component 16 further out. As a result, the outer surface of the sleeve 18 slides into the opening in the metering drum sleeve 24. If the metering volume is to be increased, the cam is turned in such a way that the spring means 30 move the common component 16 closer to the center of the metering wheel 11. For this purpose, the spring means 30, which is held by the guide means 14, presses against the shoulder 17 of the common component 16. As an alternative, it would also be possible to provide a spring 30' which was supported on a surface of the guide means 14 that was further out and pressed against a shoulder of the common component 16 formed further in the direction of the center of the metering wheel 11 in order to exert the desired force toward the center of the metering wheel 11.

The cavity 19 of the common component 16, said cavity being of substantially rectangular design, serves to accommodate and guide the supporting means 20 arranged therein. The supporting means 20 presses the filter 12, which is to be arranged on the upper side thereof, toward the underside of the metering chamber 13 and the corresponding openings in the common component 16. There is furthermore a central air duct 28, via which the corresponding openings 21 and filter 12 arranged therebetween the metering chambers 13 can be supplied with compressed air or a vacuum. Compressed air is introduced if the filled metering chamber 13 is to be discharged in order to transfer filling material into the container to be filled underneath the metering wheel 11. Compressed air can likewise be provided in order to unclog the filters 12 at a cleaning station in a cleaning position, e.g. in the horizontal state. Via the air duct 28, a vacuum is applied to the metering chamber 13 in order to assist the sucking in of the filling material. The air supply can be introduced by means of a slip ring or of a rotary union and can be partially controlled. A plurality of common components 16 is provided, each comprising a plurality of sleeve projections 18 for a plurality of metering chambers 13. However, a different number than the four common components 16 shown is also possible.

It is possible for just a single filter 12, which is of rectangular design, to be provided for a plurality of metering chambers 13 of a common component 16. Replacement of the filter 12 is also very easy, a process involving loosening the supporting means 20 so that it moves in the direction of the center of the metering wheel 11. As a result, the filter 12 is no longer clamped but can be removed easily at the side for exchange. After the filter 12 has been changed, the clamping means 22 can be reactivated, the result being that the supporting means 20 press radially outward against the underside of the filter 12 again.

The construction of the metering apparatus 8 is also simplified, in particular by the provision of the common component 16. This can now be introduced into the corresponding guide surfaces 15 as a preassembled unit with a filter 12 and supporting means 20. The spring means 30 are then fitted in guide means 14, pressing on the shoulders 17 of the common component 16. The metering drum sleeve 24 of the corresponding openings is then connected to the upper side of the guide means 14 and secured laterally with corresponding bearing covers 32.

The apparatus 8 is suitable particularly for metering pulverulent filling material but is not restricted thereto. "Pellets", very small spherical components, can also be dispensed by means of the apparatus 8.

The invention claimed is:

1. An apparatus (8) for metering pulverulent filling material, comprising at least one metering wheel (11) having a central axis and a plurality of metering chambers (13) for accommodating filling material, wherein the plurality of metering chambers (13) are formed by means of common components (16), each of the common components (16) having multiple metering chambers (13), and the common components (16) being movable in a radial direction of the metering wheel (11) using an adjusting means (10) in order to change the volume of the metering chambers (13), wherein the adjusting means (10) includes a single element that moves each of the common components (16) radially, wherein each of the common components (16) includes a plurality of projections (18) disposed axially along the common component (16), wherein each of the common components (16) includes at least one cavity (19) to accommodate a supporting means (20), and wherein for each of the common components (16) a filter (12) is arranged between the common component (16) and openings (21) of the supporting means (20), each of the openings (21) corresponding to one of the projections (18), and each of the openings (21) being a through-hole through a wall of the supporting means (20).

2. The apparatus as claimed in claim 1, characterized in that a spring means (30, 30') is provided for each of the common components (16), said spring means acting on the common component (16) for adjustment in the radial direction of the metering wheel (11).

3. The apparatus as claimed in claim 2, wherein the spring means (30, 30') is engaged on a shoulder (17) of the common component (16).

4. The apparatus as claimed in claim 3, wherein the shoulder (17) is defined by a recess on a radially outer side of the common component (16).

5. The apparatus as claimed in claim 3, wherein the shoulder (17) is defined by a recess on a radially inner side of the common component (16).

6. The apparatus as claimed in claim 1, characterized in that the filter (12) for each of the common components (16) is a single filter (12) shared by the metering chambers (13) for each of the common components (16).

7. The apparatus as claimed in claim 1, characterized in that the supporting means (20) has a common air duct (28), which is connected to the metering chambers (13) for the common component (16).

8. The apparatus as claimed in claim 7, characterized in that the air duct (28) is connected to a coupling part (26).

9. The apparatus as claimed in claim 1, characterized in that clamping means (22) are provided for each of the common components (16), said clamping means pressing the supporting means (20) against the common component (16) in order to fix the filter (12).

10. The apparatus as claimed in claim 1, wherein the single element includes a cam member disposed radially inwardly of each of the metering chambers (13).

11. The apparatus as claimed in claim 1, wherein the single element rotates about the central axis.

* * * * *